R. VON LIEBEN & E. REISZ.
E. VON LIEBEN, ADMINISTRATOR OF R. VON LIEBEN, DEC'D.
RELAY FOR UNDULATORY CURRENTS.
APPLICATION FILED JUNE 9, 1914.
Reissued July 21, 1914.
13,779.
2 SHEETS—SHEET 1.
Fig. 1,
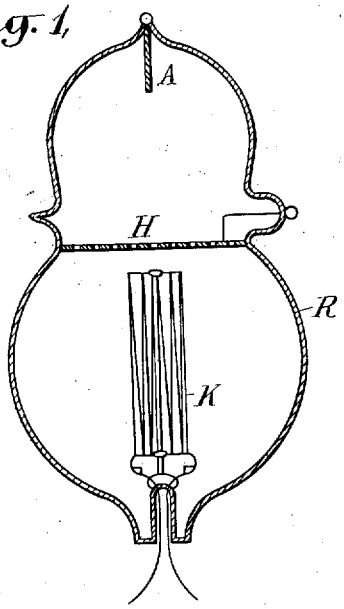
Fig. 2,
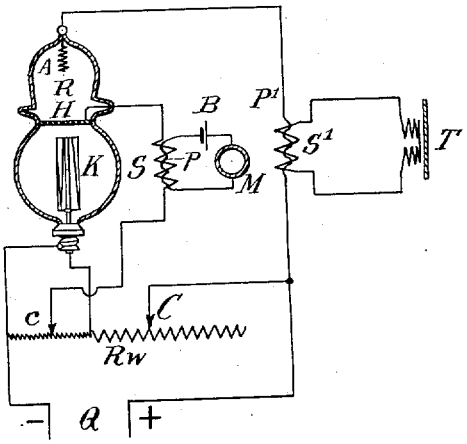
Fig. 2a
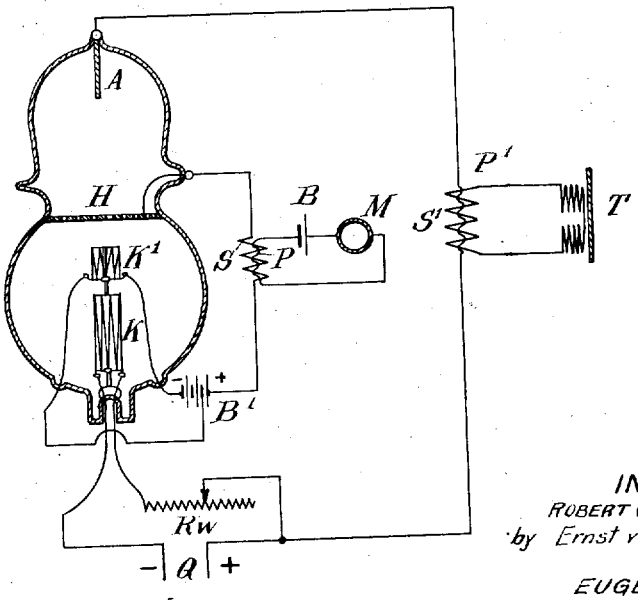
WITNESSES
C. B. Schroeder
L. Bates
INVENTORS:
ROBERT von LIEBEN
by Ernst von LIEBEN
Administrator
EUGEN REISZ
BY
Pennie Davis & Goldsborough
ATTORNEYS R. VON LIEBEN & E. REISZ.
E. VON LIEBEN, ADMINISTRATOR OF R. VON LIEBEN, DEC'D.
RELAY FOR UNDULATORY CURRENTS.
APPLICATION FILED JUNE 9, 1914.
Reissued July 21, 1914.
13,779.
2 SHEETS—SHEET 2.
Fig. 3,
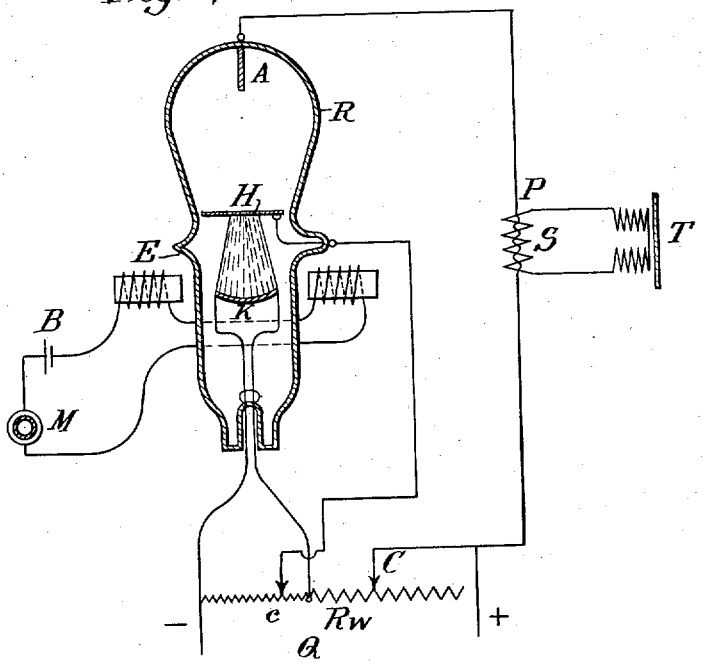
Fig. 3,a
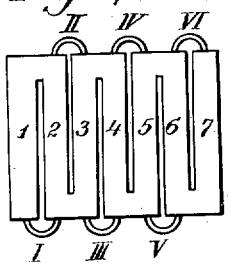
INVENTORS:
ROBERT von LIEBEN
by Ernst von LIEBEN
Administrator
EUGEN REISZ
BY
Pennie Davis & Goldsborough
ATTORNEYS
WITNESSES
C. B. Schroeder
L. Bates

UNITED STATES PATENT OFFICE.

ROBERT VON LIEBEN, DECEASED, BY ERNST VON LIEBEN, ADMINISTRATOR, OF VIENNA, AUSTRIA-HUNGARY, AND EUGEN REISZ, OF BERLIN, GERMANY, ASSIGNORS, BY DIRECT AND MESNE ASSIGNMENTS, TO THE FIRM OF RELAIS-GESELLSCHAFT M. B. H., OF VIENNA, AUSTRIA-HUNGARY.

RELAY FOR UNDULATORY CURRENTS.

13,779. Specification of Reissued Letters Patent. Reissued July 21, 1914.

Original No. 1,038,910, dated September 17, 1912, Serial No. 605,548. Application for reissue filed June 9, 1914. Serial No. 844,039.

*To all whom it may concern:*

Be it known that we, ROBERT VON LIEBEN, deceased, and EUGEN REISZ, a subjeet of the Emperor of Austria-Hungary, residing at Berlin, Germany, have invented certain new and useful Improvements in Relays for Undulatory Currents, of which the following is a specification.

This invention relates to improvements in undulatory current relays, and the primary object of the same is to reinforce current waves of the most varied frequency and form.

The invention as hereinafter disclosed and illustrated in the drawings constitutes an improvement on that disclosed in United States Patent No. 1,059,763, wherein by means of varying the ionization of the space between the electrodes, as for instance by means of cathode rays, the resistance of the circuit connected to the elctrodes is altered so that the current waves introduced will produce proportionate variations.

The subject of the present invention is a further development of the above mentioned invention, wherein instead of being altered indirectly, the resistance in the main circuit is altered directly by means of an auxiliary electrode on which the currents to be reinforced act. For this purpose the auxiliary electrode, which is likewise made of grid or net form, is arranged in such a manner that it completely intersects or divides the space between the cathode and anode in the discharge tube. Moreover, it is connected with a source of direct current in such a manner that it has an exactly defined potential corresponding to the degree of reinforcement required for the time being. In order to enable this potential to be adjusted as required, an adjustable resistance is preferably introduced between the electrodes and the source of electric current. By this means the valve-like action of the incandescent electrode is dispensed with, since the alternating current to be reinforced is superposed on a constant direct current, whereby an undulatory current is formed from the alternating current. Also the presence of the constant potential of the electrode, the magnitude of which is suitably chosen between that of the cathode and that of the anode, causes the formation of an artificial dark space near the auxiliary electrode and thus of a space where the number of ions is small, around the apertures of the auxiliary electrode toward the anode, whereby again the resistance of the main circuit, which is just what it is desired to be altered, is considerably increased. This displacement of the maximum drop of potential into proximity to and into the openings of the auxiliary electrode and also the circumstance that this grid-electrode entirely fills up the cross-section of the discharge tube, permit the employment of currents which are practically of any desired strength, since here the formation of an arc outside the grid is rendered impossible and the formation of an arc in the apertures of the grid is rendered very difficult by the production of the artificial dark space near said apertures.

The openings or contractions, as is konwn, form a virtual resistance for the gas discharge, which resistance, however, as we have discovered, can be very considerably altered if, between the cathode and the partition-wall, a constant but regulable voltage be applied; and it appears that even with a very slight increase or reduction of the potential-difference, the resistance or back electromotive force in the discharge tube will be smaller or greater. The currents to be reinforced now alter the resistance of the auxiliary electrode, whereby the currents passing between the cathode and anode are altered in proportion to this resistance.

The drawings show by way of example some constructional forms of the subject of the application.

In these drawings: Figure 1 is a section of the discharge tube. Fig. 2 is a diagram of the connections of the relay. Fig. $2^a$ shows a further constructional form of the relay with an auxiliary cathode. Fig. 3 shows a further constructional form of the subject of the application, wherein another method of altering the resistance of the auxiliary electrode is employed. Fig. $3^a$ is a development of the cathode belonging thereto.

In Fig. 1 the cathode K is arranged in the discharge tube R. This cathode is preferably an incandescent metallic oxid cathode (a Wehnelt cathode) and has the form of incandescent metal bands covered with metallic oxids, which bands are wound on a carrier or support in a similar manner to that in which metal filament lamps are constructed. This construction of the cathode has the advantage that the irregularly distributed cathode rays emitted by the incandescent bands (filaments) do not strike the auxiliary electrode directly whereby the current density is uniformly distributed over the auxiliary electrode. H is the said auxiliary electrode, which divides or intersects the space between the cathode K and the anode A and is preferably made in the form of wire gauze or netting or perforated sheet metal or as a combination of the two.

The cathode K, in combination with a regulating resistance R*w* (Fig. 2) which regulates the temperature of the incandescent metal bands, is connected to the source of direct current Q. The anode A is connected to the positive pole of the said source of current through the primary winding P′ of a transformer. To the regulating resistance R*w* is further connected at *c* the auxiliary electrode H through the secondary winding of a second transformer.

As shown in Fig. 2, the potential of the auxiliary electrode is intermediate the potentials of the anode A and the cathode K and also is intermediate between the potentials of the positive terminal of the cathode and the negative terminal thereof.

The currents from the microphone circuit B. M. superposed inductively on the circuit between K and H through the transformer P S alter the resistance of the gas discharge tube, so that the main current passing through the anode A acts through the second transformer P′ S′ on the telephone T.

The voltage which exists between the cathode K and the auxiliary electrode H, is given by the adjustment of the contact *c* of the regulating resistance R*w*. This application of a regulable pressure has been found to be an extremely important expedient for the sensitiveness of the relay, since a proportionally strong alteration of resistance in the gas discharge tube only occurs with a quite definite value of the voltage and this depends on the pressure of the gas in the tube, the temperature of the electrode, etc. It was further established by experiment that with greater strengths of the current and more especially with such strengths as first render the relay practically useful, the auxiliary electrode H, as above mentioned, must entirely or substantially shut off the cross-section of the tube, since otherwise shunting of the gas-current would occur, which almost entirely destroys the action of the relay.

The operation of the relay is not dependent on any theory but inheres in the structural features and relations above set forth but for a more complete disclosure of the nature of the invention and of the inherent advantages thereof a discussion, somewhat theoretical, may here be made.

When the current is switched on, a current flows through the Wehnelt cathode and heats it to incandescence. The heated Wehnelt cathode ionizes its surroundings and thereby a flow of current is established through the gaseous medium between the positive and the negative sides of the cathode parallel to the heating current. Simultaneously with this, there is applied to the auxiliary electrode a potential above the potential of the negative terminal of the cathode, but below the potential of the positive terminal of the cathode. This causes a further flow of current through the gaseous medium from the negative side of the cathode to the auxiliary electrode, thereby producing a further ionization which brings up the total ionization to an amount necessary to obtain the best relay action.

The currents of the microphone or line circuit B M shown in Fig. 2, act, inductively through the primary winding P, on the circuit of the auxiliary electrode H to superimpose on the low voltage constantly applied to that circuit slight fluctuations varying with the microphone current and proportional thereto. As the constantly applied voltage of that circuit is always low, the percentage fluctuation caused by the microphone is relatively high. These fluctuations in the auxiliary electrode circuit cause a corresponding fluctuation in the effective resistance of the tube and, as the result, very large fluctuations are introduced on the main current between the cathode K and the anode A, these fluctuations being superimposed on the current of constant voltage continuously passing. The fluctuations of current thus obtained are proportionate to the fluctuations caused by the microphone or the like, but much magnified or reinforced and act by means of the transformer S′, P′ on the telephone T.

The voltage applied to the auxiliary electrode should be, preferably such as to raise the potential of the auxiliary electrode only to such a degree that the difference of potential between the negative side of the cathode and the auxiliary electrode will be less than the difference of potential between the auxiliary electrode and the anode, as is indicated in Fig. 2. The percentage rate of the fluctuations of said voltage due to the line currents from the microphone are then comparatively large, whereby the total magnification of the microphone currents is very great.

It will now be clear that line or microphone currents acting upon the transformer P S are superimposed upon the current of the auxiliary electrode H, and thereby alter the virtual resistance for the main currents between K and A, and each variation of said resistance causes a corresponding and much larger fluctuation of the current passing from the cathode K to the anode A. These magnified fluctuations then act upon the transformer P′ S′, and are transmitted to the telephone T or other receiving instrument connected to the secondary of said transformer.

In Fig. 2ª, a second cathode K′ is provided which is connected to a separate source of current B′, to the positive pole of which the electrode H is connected through the transformer. Since in this system of connections the temperature of the cathode K′ can be made independent of the cathode K, the voltage of the current applied to the cathode K can be very considerably reduced by a correspondingly high temperature of the bands at K′, and, consequently, the variations of current of the transformer P S increased, without the main current flowing to the anode in the discharge tube being considerably increased. The temperature of the main cathode and therefore the current flowing through the anode A cannot be increased indefinitely, since at a critical value of the current determined by the cross-section of the tube, the sensitiveness of the relay again decreases.

Another form of construction of the relay is shown in Fig. 3. In this, the cathode K is made in the form of a concave mirror in order to unite the rays emitted thereby into one pencil; H is the auxiliary electrode, which is again arranged as a partition wall between the cathode and anode and has an opening or window, provided with a perforated metal sheet or wire gauze forming a grid. The anode A is connected in a known manner to the positive pole of Q. The pair of electromagnets E is connected in series with the microphone M and a battery. In the opening or window of the auxiliary electrode H is mounted a piece of perforated sheet metal, a grid or combination of the two, in order to increase the back electromotive force or rather the main resistance to be altered of the tube between K and A. The regulating resistance R*w* with the contacts *c* and C is connected as in the form shown in Fig. 2. The alterations of current in the microphone circuit cause the pencil of rays to be deflected, whereby the apertures in the window of the auxiliary electrode H, to which a constant direct current potential can be applied, are more or less struck by the pencil of cathode rays and are therefore subjected to an ionization of varying intensity. By this means the back electromotive force or the resistance in the main circuit between K and A is altered according to the variations of current in the primary. The back electromotive force or resistance in the discharge tube increases when the pencil of rays is deflected from the opening and decreases when the pencil of rays strikes the opening or window. The concave mirror cathode is preferably made in such a manner that in order to avoid too high currents for the heating thereof, the conductor is arranged in zigzag form and the several strips are mechanically supported relatively to each other by fire-proof bridge-pieces *e. g.*, of glass or porcelain, as shown by way of example in Fig. 3ª, in which the transverse members of the zigzag conductor produced by slotting a sheet of platinum alternately on opposite sides are marked 1, 2, 3, and the glass bridge-pieces I, II, III.

For both arrangements experiments have shown that for the proportional reproduction of alternating currents, the openings in the partition-wall must be made of different sizes.

The above described relay for undulating currents can be employed for strengthening sound, as a relay in overhead wire and cable telephony, in short and long distance communication, also in wireless telegraphy and telephony, as an auxiliary apparatus for the telegraphone and as a cell sensitive to light for the electric transmission of pictures, etc.

We claim:

1. A relay for undulatory currents comprising a discharge tube, an incandescent metallic oxid cathode and an anode therein, an auxiliary electrode formed with apertures between said cathode and anode, means for supplying said electrodes with current, the potential of the auxiliary electrode being established intermediate between the potentials of the cathode and of the anode.

2. A relay for undulatory currents comprising a discharge tube, a cathode and an anode therein, an auxiliary electrode formed with apertures between said cathode and anode, means for supplying said electrodes with current, the difference of potential between the cathode and the auxiliary electrode being less than the difference of potential between the auxiliary electrode and the anode.

3. A relay for undulatory currents comprising a discharge tube, a metallic oxid cathode therein heated to incandescence, a circuit comprising a source of direct current for heating said cathode, an anode, an auxiliary electrode formed with apertures between said cathode and anode, means for supplying said electrodes with current, the potential of the auxiliary electrode being established intermediate between the potentials of the cathode and of the anode.

4. A relay for undulatory currents comprising a discharge tube, a metallic oxid cathode therein heated to incandescence, a circuit comprising a source of direct current for heating said cathode, an anode, an auxiliary electrode formed with apertures between said cathode and anode, means for supplying said electrodes with current, the potential of the auxiliary electrode being intermediate between the terminal potentials of the heating circuit of the cathode.

5. A relay for undulatory currents comprising a discharge tube, a cathode and an anode therein, an auxiliary electrode formed with apertures and intersecting the space in the discharge tube and substantially dividing it into separate parts, and a source of direct current connected to said auxiliary electrode.

6. A relay for undulatory currents comprising a discharge tube, a cathode and an anode therein, an auxiliary electrode to cause a drop of potential between the cathode and anode and formed with apertures and intersecting the space in the discharge tube between said cathode and anode and dividing it into separate parts, and a source of direct current connected to said auxiliary electrode.

7. A relay for undulatory currents comprising a discharge tube, a cathode and an anode therein embodied in an electric circuit with said cathode, an auxiliary electrode formed with apertures and intersecting the space between the cathode and the anode, a source of direct current connected to said auxiliary electrode, the latter forming a resistance for the currents in the circuit, and means for varying said resistance in accordance with the currents to be reinforced.

8. In a relay for undulatory currents, an exhausted discharge tube, a cathode and an anode therein, embodied in an electric circuit, a grid-like auxiliary electrode intersecting the discharge tube between the cathode and the anode and dividing it into separate parts, a source of direct current connected to the auxiliary electrode, the latter forming a resistance for the currents in the circuit, an adjustable resistance between said source of direct current and the auxiliary electrode, and means for varying the resistance of said electrode in accordance with the currents to be reinforced.

9. In a relay for undulatory currents, an exhausted discharge tube, a cathode of metallic oxid filaments heated to incandescence, the filaments being wound on a carrier in the manner of a metal filament lamp, an anode embodied in an electric circuit with said cathode, a grid-like auxiliary electrode intersecting the space of the discharge tube and dividing it into separate parts, this electrode being perpendicular to the axis of the carrier, a source of direct current connected to said electrode, the latter thus forming a resistance for the currents in the circuit, an adjustable resistance between the source of direct current and the electrode, and means for varying the resistance of said electrode in accordance with the currents to be reinforced.

10. In a relay for undulatory currents, an exhausted discharge tube, a cathode and an anode therein embodied in an electric circuit, a grid-like auxiliary electrode intersecting the discharge tube between the cathode and the anode and dividing it into separate parts, a source of direct current connected to the auxiliary electrode, an adjustable resistance in the circuit between the source of direct current and the auxiliary electrode, and means to superpose the undulating currents to be reinforced on said circuit.

11. In a relay for undulatory currents, an exhausted discharge tube, a cathode and an anode therein embodied in an electric circuit, an auxiliary cathode embodied in a separate circuit, a grid-like auxiliary electrode intersecting the discharge tube between the auxiliary cathode and the anode and dividing it into separate parts, a source of direct current connected to the auxiliary electrode and the circuit of the auxiliary cathode, and means to superpose the undulating currents to be reinforced on the circuit of the direct current source.

12. A relay for undulatory currents comprising a discharge tube, a cathode and an anode therein, an auxiliary electrode formed with apertures and intersecting the space in the discharge tube and dividing it into separate parts, means for supplying said electrodes with current, the potential of the auxiliary electrode being established intermediate between the potentials of the cathode and of the anode.

13. A relay for undulatory currents comprising a discharge tube, a cathode and an anode therein, an auxiliary electrode formed with apertures between said cathode and anode, and connected with a source of direct current thus forming a virtual resistance in the circuit of the cathode and anode, means for supplying said electrodes with current, the potential of the auxiliary electrode being established intermediate between the potentials of the anode and of the cathode, and means for varying the virtual resistance formed by the auxiliary electrode in accordance with the currents to be reinforced.

14. A relay for undulatory currents comprising a discharge tube, a cathode and an anode therein, an auxiliary electrode formed with apertures between said cathode and anode, and connected with a source of direct current thus forming a virtual resistance in the circuit of the cathode and anode, an adjustable resistance between said source of direct current and the auxiliary electrode, means for supplying said electrodes with current, the voltage of the current supplied to the auxiliary electrode being less than the voltage between the cathode and the anode, and means for varying the virtual resistance formed by the auxiliary electrode in accordance with the currents to be reinforced.

15. A relay for undulatory currents comprising a discharge tube, a cathode and an anode therein, an auxiliary electrode formed with apertures between said cathode and anode and connected with a source of direct current thus forming a virtual resistance in the circuit of the cathode and anode, an adjustable resistance between said source of direct current and the auxiliary electrode, means for supplying said electrodes with current, the voltage of the current supplied to the auxiliary electrode being less than the voltages between the cathode and the anode and means to superpose the undulating currents to be reinforced on the circuit of the auxiliary electrode.

16. A relay for undulatory currents comprising a discharge tube, a cathode and an anode therein, an auxiliary electrode formed with apertures between said cathode and anode intersecting the space in the discharge tube and dividing it into separate parts and connected with a source of direct current thus forming a virtual resistance in the circuit of the cathode and of the anode, means for supplying said electrodes with current, the potential of the auxiliary electrode being established intermediate between the potentials of the cathode and of the anode and means to superpose the undulating currents to be reinforced on the circuit of the auxiliary electrode.

17. A relay for undulatory currents comprising a discharge tube, a metallic oxid cathode therein heated to incandenscence, the filaments being wound on a carrier in the manner of a metal filament lamp, a circuit comprising a source of direct current for heating said cathode, an anode, an auxiliary electrode formed with apertures between said cathode and anode, this electrode being perpendicular to the axis of the carrier and connected with a source of direct current thus forming a virtual resistance in the circuit of the cathode and anode, means for supplying said electrodes with currents, the potential applied to the auxiliary electrode being intermediate between the terminal potentials of the heating circuit of the cathode, and means for varying the virtual resistance formed by the auxiliary electrode in accordance with the currents to be reinforced.

18. A relay for undulatory currents comprising a discharge tube, a metallic oxid cathode therein heated to incandescence, the filaments being wound on a carrier in the manner of a metal filament lamp, a circuit comprising a source of direct current for heating said cathode, an anode, an auxiliary electrode formed with apertures between said cathode and anode, this electrode dividing said tube into two separate parts and being connected with a source of direct current thus forming a virtual resistance in the circuit of the cathode and anode, means for supplying said electrode with current of varying voltage, the potential of the auxiliary electrode being established intermediate between the potentials of the cathode and of the anode, and means for varying the virtual resistance formed by the auxiliary electrode in accordance with the currents to be reinforced.

In testimony whereof we have hereunto set our hands and seals at Vienna, Austria, on the date below written.

Signed at Berlin, Germany, this 7th day of May, 1914.

DR. ERNST VON LIEBEN, [L. S.]
*Administrator of the estate of Robert von Lieben, deceased.*

EUGEN REISZ. [L. S.]

Witnesses to the signature of the administrator:

SIEGMUND STRAUSS,
AUGUST FUGGER.

Witnesses to the signature of Eugen Reisz:

ANNEMARIE REISZ,
BRUNO PUTZIGER.

Corrections in Reissue Letters Patent No. 13,779.

It is hereby certified that in reissue Letters Patent No. 13,779, granted July 21, 1914, upon the application of Ernst von Lieben, of Vienna, Austria-Hungary, administrator of Robert von Lieben, deceased, and Eugen Reisz, of Berlin, Germany, for an improvement in "Relays for Undulatory Currents," errors appear in the printed specification requiring correction as follows: Page 1, line 42, for the word "electrodes" read *electrode;* page 3, line 47, after the word "or" insert the article *a;* and that the said Letters Patent should be read with these corrections therein that the same may conform to the record of the case in the Patent Office.

Signed and sealed this 22nd day of September, A. D., 1914.

[SEAL.]

R. F. WHITEHEAD,

*Acting Commissioner of Patents.*